(12) United States Patent
Tanaka

(10) Patent No.: US 6,287,479 B1
(45) Date of Patent: Sep. 11, 2001

(54) MAGNETIC CERAMIC COMPOSITION AND INDUCTOR COMPONENT USING THE SAME

(75) Inventor: Hiromi Tanaka, Omihachiman (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/510,066

(22) Filed: Feb. 22, 2000

(30) Foreign Application Priority Data

Mar. 2, 1999 (JP) .................................................. 11-053988

(51) Int. Cl.[7] ...................................................... H01R 1/34
(52) U.S. Cl. .................. 252/62.6; 252/62.62; 252/62.59
(58) Field of Search ................ 252/62.6, 62.59, 252/62.62

(56) References Cited

U.S. PATENT DOCUMENTS 5,906,768   5/1999   Kakinuma et al. ............... 252/62.62

FOREIGN PATENT DOCUMENTS

| 883291 | 11/1961 | (GB) . |
| 5-326243-A | * 12/1993 | (JP) . |
| 08-325056 | 10/1996 | (JP) . |
| 09-063826 | 7/1997 | (JP) . |
| 09-007815 | 10/1997 | (JP) . |

OTHER PUBLICATIONS

WPI Abstract Accession No. 1998–199123[18] & PJ100050514 A (TDK Corporation) Feb. 20, 1998 see abstract.
WPI Abstract Accession No. 1995–096583[13] & RU1355015 C Jul. 15, 1994 see abstract.

* cited by examiner

*Primary Examiner*—C. Melissa Koslow
(74) *Attorney, Agent, or Firm*—Ostrolenk, Faber, Gerb & Soffen LLP

(57) ABSTRACT

Magnetic ceramic compositions include a Fe compound, a Zn compound, a Ni compound and a Cu compound as primary components, and also includes a bismuth compound and a cobalt compound as additive components. The primary component composition ratio ($Fe_2O_3$, ZnO, NiO+CuO) represented by molar percent of $Fe_2O_3$, ZnO, and (NiO and CuO), is in the region enclosed by point A (48.0, 0.5, 51.5), point B (48.0, 1.5, 50.5), point C (45.5, 4.0, 50.5), point D (44.0, 4.0, 52.0), and point E (44.0, 0.5, 55.5) in a ternary diagram. About 8.0 to 14.0 molar percent of the Cu compound is included in 100 molar percent of the primary components as $Fe_2O_3$, ZnO, NiO, and CuO. About 0.25 to 1.0 part by weight of the bismuth compound as $Bi_2O_3$ and about 0.25 to 3.0 parts by weight of the cobalt compound as $Co_3O_4$ with respect to 100 parts by weight of the primary components are included.

12 Claims, 2 Drawing Sheets

MAGNETIC CERAMIC COMPOSITION AND INDUCTOR COMPONENT USING THE SAME

BACKGROUND OF THE INVENTION

1. Field of the Invention

The present invention relates to a magnetic ceramic composition and an inductor component using the same.

2. Description of the Related Art

Magnetic ceramic compositions primarily composed of $Fe_2O_3$, ZnO, NiO and CuO are known. The magnetic ceramic compositions have been used as magnetic bodies for inductor components as a countermeasure against noise and the like.

Inductor components, such as stacked chip inductors used in personal computers and the like, have low impedance in a high speed signal line at or above 75 MHz as a countermeasure against noise in this signal frequency range. However, in order to eliminate noise in a high frequency range at or above 200 MHz, inductor components must have high impedance and the rise of the impedance curve thereof must be steep.

Hence, magnetic bodies used for the inductor components described above must have low initial permeability $\mu_i$ (for example, below 10) in a high frequency range, such as at or above 200 MHz, and the threshold frequency of this initial permeability $\mu_i$ must be increased at a higher frequency range. In order to decrease deflection and delay of signals, which is specifically required for high speed signals, magnetic bodies used for inductor components must have superior temperature stability.

Conventionally, amounts of ZnO contained in magnetic ceramic compositions were decreased in order to decrease the initial permeability $\mu_i$. However, even when ZnO is decreased to 0 molar percent, the initial permeability $\mu_i$ is decreased to only 20, and the threshold frequency thereof remains at or below 100 MHz.

In some cases, air-core coils are used for inductor components for high frequency use. In this case, the initial permeability $\mu_i$ is 1. However, the impedance thereof is low in the frequency range of 700 to 800 MHz, and sufficient effects for countermeasures against noise cannot be obtained.

Stacked chip inductors have laminated structures provided with internal conductors therein containing, for example, silver. When sintering is performed to obtain the laminated structure, consideration of suppressing undesired diffusion of components, such as silver, contained in the internal conductors is required. Hence, it is preferable that magnetic ceramic compositions used for magnetic bodies can be sintered at low temperature, such as at or below 930° C.

SUMMARY OF THE INVENTION

The present invention provides magnetic ceramic compositions and inductor components using the same, which can solve the problems and can meet the requirements described above.

The present invention specifically provides magnetic ceramic compositions and inductor components using the same, in which a small initial permeability $\mu_i$ below 10 can be obtained, and the threshold frequency of small initial permeability $\mu_i$ below 10 is not lowered in a high frequency range, such as at or above 200 MHz.

The present invention also provides magnetic ceramic compositions having superior temperature stability of the initial permeability $\mu_i$ and inductor components using the same.

The present invention also provides magnetic ceramic compositions which can be sintered at lower temperatures, such as at or below 930° C., and inductor components using the same.

To these ends, the magnetic ceramic compositions according to the present invention includes a Fe compound, a Zn compound, a Ni compound and a Cu compound as primary components, and also includes a bismuth compound and a cobalt compound as additive components.

Concerning the primary components, the composition ratio ($Fe_2O_3$, ZnO, NiO+CuO) of the Fe compound, the Zn compound, the Ni compound and the Cu compound represented by molar percent as $Fe_2O_3$, ZnO and (NiO and CuO), respectively, is in the region enclosed by point A (48.0, 0.5, 51.5), point B (48.0, 1.5, 50.5), point C (45.5, 4.0, 50.5), point D (44.0, 4.0, 52.0), and point E (44.0, 0.5, 55.5) in the ternary diagram in FIG. 1. An absolute amount of about 8.0 to 14.0 molar percent of the Cu compound is included based on 100 molar percent of the primary components as $Fe_2O_3$, ZnO, NiO and CuO.

Concerning additive components, with respect to 100 parts by weight of the primary components as $Fe_2O_3$, ZnO, NiO, and CuO, about 0.25 to 1.0 part by weight of a bismuth compound as $Bi_2O_3$, and about 0.25 to 3.0 parts by weight of a cobalt compound as $Co_3O_4$ are included.

Accordingly, by using the magnetic ceramic composition as a magnetic body, when the initial permeability $\mu_i$ is maintained to be below 10, the threshold frequency therefor is not decreased even in higher frequency ranges, such as at or above 200 MHz, whereby an inductor component having superior effects for countermeasures against noise can be obtained.

In addition, since the superior sintered state of the magnetic ceramic composition according to the present invention can be obtained by sintering at low temperatures, such as at or below 930° C., the magnetic ceramic composition can be advantageously employed for a magnetic body used for an inductor component having a laminated structure provided with internal conductors containing metal, such as silver, therein.

In the magnetic ceramic composition according to the present invention, it is preferable that about 0.5 to 3.5 parts by weight of a zirconium compound as $ZrO_2$ be further included as an additive component with respect to 100 parts by weight of the primary components as $Fe_2O_3$, ZnO, NiO and CuO. This permits superior temperature stability of the initial permeabilities $\mu_i$ to be achieved. Accordingly, in the inductor component using the magnetic ceramic composition as the magnetic body, deflection and delay of high-speed signals can be suppressed.

For the reasons mentioned above, the present invention can be applied to inductor components using the magnetic ceramic compositions described above as magnetic bodies inductor components having laminated structures provided with internal conductors therein.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENT

The magnetic ceramic composition according to the present invention includes the Fe compound, the Zn compound, the Ni compound and the Cu compound as primary components. The ratio ($Fe_2O_3$, ZnO, NiO+CuO) of the Fe compound, the Zn compound, the Ni compound, and the Cu compound represented by molar percent as $Fe_2O_3$, ZnO, and (NiO and CuO), respectively, is in the region enclosed by point A (48.0, 0.5, 51.5), point B (48.0, 1.5, 50.5), point C (45.5, 4.0, 50.5), point D (44.0, 4.0, 52.0), and point E (44.0, 0.5, 55.5) in the ternary diagram shown in FIG. 1. The Cu compound molar percent is about 8–14 molar % based on 100 molar percent of the primary components as $Fe_2O_3$, ZnO, NiO, and CuO.

The magnetic ceramic composition according to the present invention also includes a bismuth compound and a cobalt compound as additive components. With respect to 100 parts by weight of the primary components as $Fe_2O_3$, ZnO, NiO, and CuO, described above, about 0.25 to 1.0 part by weight of the bismuth compound as $Bi_2O_3$ and about 0.25 to 3.0 parts by weight of the cobalt compound as $Co_3O_4$ are designed to be included, respectively.

By replacing a part of the primary components with $Co^{2+}$, magnetic anisotropy caused by electrodiffusion can be generated, and the magnetic domain wall can therefore be fixed at a stable position. Consequently, the magnetic ceramic composition having smaller initial permeability $\mu_i$ (below 10) and a threshold frequency in the high frequency range at approximately 700 MHz, can be obtained. In addition, the magnetic ceramic composition can be sintered at low temperatures at or below 930° C.

Addition of Co compound causes deterioration of the temperature property of the initial permeability $\mu_i$ in some cases. In order to improve these temperature properties, addition of a small amount of a Zr compound is effective. Hence, in the magnetic ceramic composition according to the present invention, it is preferable that about 0.5 to 3.5 parts by weight of a zirconium compound calculated as $ZrO_2$ be further added as an additive component to 100 parts by weight of the primary components as $Fe_2O_3$, ZnO, NiO and CuO.

Figure 2:
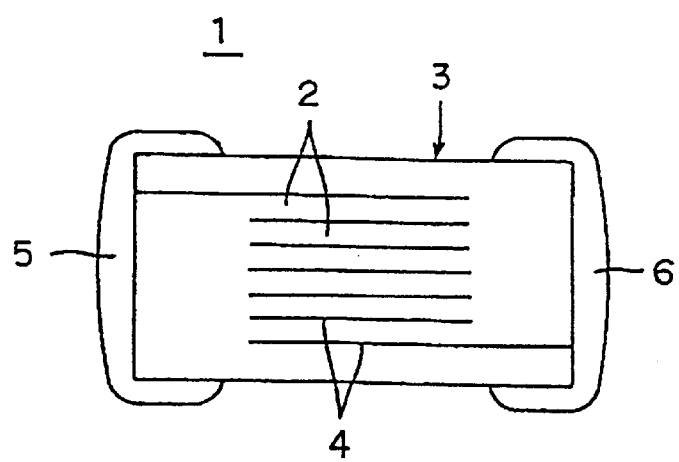
FIG. 2 is a graphical cross-sectional view showing a stacked chip inductor 1 as an inductor component in one embodiment according to the present invention.

FIG. 2 is a graphical cross-sectional view illustrating a stacked inductor 1 of one embodiment of inductor components according to the present invention.

The stacked chip inductor 1 is provided with an inductor body 3 having the structure of a plurality of laminated magnetic layers 2. In the inductor body 3, internal conductors 4 containing, for example, silver, are provided. Individual internal conductors 4 include portions extending along the interfaces between the magnetic layers 2 shown in the figure and portions, which is not shown, penetrating the magnetic layers 2, and the whole structure is configured so as to extend in the form of coils.

The inductor body 3 described above is obtained by sintering a raw inductor body 3 formed by laminating green sheets made to be the magnetic layers 2 while the internal conductors 4 are being formed.

Outer terminal electrodes 5 and 6 are provided at individual outer surfaces of the inductor body 3 and are electrically connected to the individual terminals of the internal conductors 4 that extend to the individual outer surfaces of the inductor body 3. The outer terminal electrodes 5 are formed by, for example, coating and baking a conductive paste containing silver.

In the stacked chip inductor 1 thus described, materials to be used for forming the magnetic layer 2 are the magnetic ceramic compositions described above.

EXAMPLES $Fe_2O_3$, ZnO, NiO and CuO were prepared as starting materials for primary components of a magnetic ceramic composition, and $Bi_2O_3$, $Co_3O_4$ and $ZrO_2$ were prepared as starting materials for additive components thereof.

Next, those starting materials were wet-blended so as to have the compositions as shown in Tables 1 and 2. In Tables 1 and 2, the primary components are represented by molar percent of the individual primary components, and individual additive amounts are represented by parts by weight with respect to 100 parts by weight of the primary components.

After dehydrating blended powders described above, they were calcined at 800° C. for 2 hours and were then pulverized.

Next, binders were added to the individual powder obtained by pulverizing, and green sheets were formed therefrom.

After stacking those green sheets, they were pressed and formed into blocks. Those blocks were cut into the forms having an outer diameter of 20 mm, an inner diameter of 10 mm and a thickness of 1 mm so as to obtain toroidal cores, and they were then fired at 930° C.

In order to evaluate the sintering properties of the toroidal cores thus obtained as sintered bodies, water absorption and densities were measured. By measuring inductance of the toroidal cores, which were wound with soldered soft copper wires, the initial permeabilities $\mu_i$ were calculated. The results are shown in Tables 1 and 2.

TABLE 1

| Sample No. | Primary Component (molar %) | | | | Additive Component (molar %) | | | $\mu_i$ | Density (g/cm³) | Water Absorption (%) |
|---|---|---|---|---|---|---|---|---|---|---|
| | $Fe_2O_3$ | ZnO | NiO | CuO | $Bi_2O_3$ | $Co_3O_4$ | $ZrO_2$ | | | |
| *1  | 48.5 | 0.0 | 38.5 | 13.0 | 0.75 | 2.00 | 3.00 | 13 | 4.89 | 0.56 |
| *2  | 48.5 | 1.0 | 38.5 | 12.0 | 0.75 | 2.00 | 3.00 | 14 | 4.98 | 0.15 |
| *3  | 48.0 | 0.0 | 40.0 | 12.0 | 1.00 | 0.20 | 0.50 | 10 | 4.85 | 0.55 |
| 4   | 48.0 | 0.5 | 39.5 | 12.0 | 1.00 | 0.25 | 0.50 | 9  | 5.15 | 0.00 |
| 5   | 48.0 | 0.5 | 39.5 | 12.0 | 1.00 | 0.40 | 0.75 | 8  | 5.21 | 0.01 |
| 6   | 48.0 | 1.0 | 39.0 | 12.0 | 1.00 | 0.40 | 0.75 | 9  | 5.22 | 0.01 |
| 7   | 48.0 | 1.5 | 38.5 | 12.0 | 1.00 | 0.40 | 0.75 | 9  | 5.12 | 0.01 |
| *8  | 48.0 | 2.0 | 38.0 | 12.0 | 1.00 | 0.40 | 0.50 | 11 | 5.23 | 0.00 |
| *9  | 47.5 | 1.0 | 39.5 | 12.0 | 0.25 | 0.20 | 0.00 | 18 | 5.18 | 0.01 |
| 10  | 47.5 | 1.0 | 39.5 | 12.0 | 0.25 | 1.60 | 1.00 | 8  | 5.20 | 0.01 |
| 11  | 47.5 | 1.0 | 38.5 | 13.0 | 0.50 | 1.80 | 1.00 | 7  | 5.22 | 0.01 |
| 12  | 47.5 | 2.0 | 39.5 | 11.0 | 0.25 | 2.50 | 1.00 | 7  | 5.19 | 0.01 |
| 13  | 47.5 | 2.0 | 40.0 | 10.0 | 0.50 | 2.50 | 1.00 | 7  | 5.20 | 0.01 |
| 14  | 47.5 | 2.0 | 38.5 | 12.0 | 0.75 | 2.00 | 3.00 | 6  | 5.23 | 0.01 |
| 15  | 47.5 | 2.0 | 37.5 | 13.0 | 0.50 | 2.50 | 2.00 | 6  | 5.20 | 0.01 |
| 16  | 46.5 | 1.0 | 39.5 | 13.0 | 0.75 | 1.40 | 2.00 | 6  | 5.24 | 0.01 |
| 17  | 46.5 | 1.0 | 38.5 | 14.0 | 1.00 | 2.00 | 3.50 | 5  | 5.26 | 0.00 |
| 18  | 46.5 | 2.0 | 38.5 | 13.0 | 0.50 | 2.50 | 3.00 | 7  | 5.25 | 0.01 |
| 19  | 46.5 | 3.0 | 42.5 | 8.0  | 0.50 | 2.50 | 3.00 | 6  | 5.16 | 0.00 |
| 20  | 46.5 | 3.0 | 40.5 | 10.0 | 0.50 | 2.50 | 3.50 | 6  | 5.20 | 0.00 |
| 21  | 46.5 | 3.0 | 38.5 | 12.0 | 0.50 | 2.00 | 3.00 | 6  | 5.24 | 0.01 |
| *22 | 46.0 | 4.0 | 38.0 | 12.0 | 0.50 | 2.00 | 3.00 | 11 | 5.25 | 0.01 |

TABLE 2

| Sample No. | Primary Component (molar %) | | | | Additive Component (molar %) | | | $\mu_i$ | Density (g/cm³) | Water Absorption (%) |
|---|---|---|---|---|---|---|---|---|---|---|
| | $Fe_2O_3$ | ZnO | NiO | CuO | $Bi_2O_3$ | $Co_3O_4$ | $ZrO_2$ | | | |
| 23  | 45.5 | 0.5 | 39.0 | 12.0 | 0.50 | 2.20 | 3.00 | 5  | 5.16 | 0.01 |
| 24  | 45.5 | 1.0 | 40.5 | 13.0 | 0.50 | 2.20 | 0.00 | 5  | 5.27 | 0.00 |
| 25  | 45.5 | 1.0 | 40.5 | 13.0 | 0.50 | 2.20 | 2.00 | 5  | 5.26 | 0.00 |
| 26  | 45.5 | 1.0 | 40.5 | 13.0 | 0.75 | 2.00 | 3.50 | 4  | 5.22 | 0.00 |
| 27  | 45.5 | 1.5 | 40.0 | 13.0 | 0.50 | 2.00 | 3.00 | 6  | 5.21 | 0.01 |
| 28  | 45.5 | 1.5 | 39.0 | 14.0 | 0.75 | 2.20 | 3.50 | 4  | 5.28 | 0.00 |
| *29 | 45.5 | 2.0 | 39.5 | 13.0 | 0.75 | 0.00 | 3.00 | 18 | 5.16 | 0.38 |
| *30 | 45.5 | 2.0 | 39.5 | 13.0 | 0.75 | 3.25 | 3.00 | 1  | 4.95 | 0.09 |
| *31 | 45.5 | 2.0 | 45.5 | 7.0  | 0.75 | 2.00 | 3.00 | 5  | 4.85 | 0.63 |
| *32 | 45.5 | 2.0 | 39.5 | 13.0 | 0.00 | 2.00 | 3.00 | 7  | 4.86 | 0.55 |
| 33  | 45.5 | 2.0 | 39.5 | 13.0 | 0.25 | 2.00 | 0.00 | 6  | 5.20 | 0.01 |
| 34  | 45.5 | 2.0 | 39.5 | 13.0 | 0.25 | 3.00 | 0.00 | 5  | 5.26 | 0.00 |
| 35  | 45.5 | 2.0 | 39.5 | 13.0 | 0.25 | 3.00 | 2.00 | 3  | 5.18 | 0.01 |
| 36  | 45.5 | 2.0 | 39.5 | 13.0 | 0.50 | 2.00 | 2.00 | 3  | 5.20 | 0.01 |
| 37  | 45.5 | 2.0 | 39.5 | 13.0 | 0.50 | 2.00 | 3.00 | 5  | 5.26 | 0.00 |
| 38  | 45.5 | 2.0 | 39.5 | 13.0 | 0.75 | 3.00 | 3.00 | 2  | 5.26 | 0.00 |
| 39  | 45.5 | 2.0 | 39.5 | 13.0 | 0.75 | 3.00 | 0.00 | 3  | 5.28 | 0.00 |
| 40  | 45.5 | 2.0 | 39.5 | 13.0 | 1.00 | 2.00 | 0.00 | 4  | 5.28 | 0.00 |
| 41  | 45.5 | 2.0 | 39.5 | 13.0 | 1.00 | 2.00 | 3.00 | 4  | 5.23 | 0.00 |
| 42  | 45.5 | 2.0 | 39.5 | 13.0 | 1.00 | 2.00 | 3.50 | 4  | 5.20 | 0.01 |
| 43  | 45.5 | 2.0 | 38.5 | 14.0 | 1.00 | 2.00 | 3.00 | 5  | 5.25 | 0.00 |
| *44 | 45.5 | 2.0 | 39.5 | 13.0 | 1.25 | 2.00 | 3.00 | 12 | 5.29 | 0.00 |
| 45  | 45.5 | 2.0 | 38.5 | 14.0 | 1.00 | 2.00 | 3.50 | 5  | 5.24 | 0.01 |
| 46  | 45.5 | 2.0 | 38.5 | 14.0 | 0.75 | 1.80 | 3.00 | 6  | 5.22 | 0.01 |
| 47  | 45.5 | 2.0 | 38.5 | 14.0 | 0.75 | 2.00 | 3.00 | 5  | 5.28 | 0.00 |
| 48  | 45.5 | 2.0 | 38.5 | 14.0 | 0.75 | 2.20 | 3.00 | 5  | 5.29 | 0.01 |
| 49  | 45.5 | 2.0 | 38.5 | 14.0 | 1.00 | 2.00 | 3.50 | 6  | 5.31 | 0.00 |
| *50 | 45.5 | 2.0 | 37.5 | 15.0 | 0.75 | 2.00 | 3.00 | 11 | 5.18 | 0.01 |
| 51  | 45.5 | 2.5 | 39.0 | 13.0 | 0.50 | 1.40 | 2.00 | 6  | 5.23 | 0.01 |
| 52  | 45.5 | 2.5 | 39.0 | 13.0 | 0.75 | 1.40 | 3.00 | 5  | 5.26 | 0.00 |
| 53  | 45.5 | 2.5 | 39.0 | 13.0 | 0.75 | 1.80 | 3.00 | 5  | 5.27 | 0.00 |
| 54  | 45.5 | 2.5 | 39.0 | 13.0 | 0.75 | 2.20 | 3.00 | 3  | 5.32 | 0.00 |
| 55  | 45.5 | 3.0 | 38.5 | 13.0 | 0.50 | 2.00 | 3.00 | 6  | 5.20 | 0.01 |
| 56  | 45.5 | 3.0 | 37.5 | 14.0 | 1.00 | 2.00 | 3.50 | 5  | 5.29 | 0.00 |
| *57 | 45.5 | 4.0 | 43.5 | 7.0  | 0.75 | 2.00 | 3.00 | 5  | 4.96 | 0.23 |
| 58  | 45.5 | 4.0 | 42.5 | 8.0  | 0.50 | 2.50 | 2.00 | 7  | 5.22 | 0.01 |
| 59  | 45.5 | 4.0 | 40.5 | 10.0 | 0.75 | 2.00 | 2.00 | 8  | 5.25 | 0.00 |

TABLE 2-continued

| | Composition | | | | | | | | |
|---|---|---|---|---|---|---|---|---|---|
| | Primary Component (molar %) | | | | Additive Component (molar %) | | | | Water |
| Sample No. | $Fe_2O_3$ | ZnO | NiO | CuO | $Bi_2O_3$ | $Co_3O_4$ | $ZrO_2$ | $\mu_i$ | Density (g/cm³) | Absorption (%) |
| 60 | 45.5 | 4.0 | 38.5 | 12.0 | 1.00 | 2.00 | 3.50 | 7 | 5.27 | 0.00 |
| 61 | 45.5 | 4.0 | 39.5 | 13.0 | 1.00 | 2.00 | 3.00 | 7 | 5.29 | 0.00 |
| *62 | 45.5 | 4.0 | 35.5 | 15.0 | 0.75 | 2.00 | 3.00 | 12 | 5.19 | 0.01 |
| *63 | 45.5 | 4.5 | 37.5 | 13.0 | 0.75 | 2.00 | 3.00 | 12 | 5.23 | 0.01 |
| 64 | 44.5 | 4.0 | 38.5 | 13.0 | 0.75 | 2.00 | 3.00 | 8 | 5.23 | 0.00 |
| *65 | 44.0 | 0.0 | 42.0 | 14.0 | 1.00 | 2.00 | 3.00 | 5 | 4.85 | 0.35 |
| 66 | 44.0 | 2.0 | 40.0 | 14.0 | 1.00 | 2.20 | 3.50 | 6 | 5.16 | 0.01 |
| 67 | 44.0 | 4.0 | 39.0 | 13.0 | 0.75 | 2.00 | 3.00 | 9 | 5.26 | 0.00 |
| 68 | 44.0 | 4.0 | 39.0 | 13.0 | 1.00 | 2.00 | 3.00 | 9 | 5.27 | 0.00 |
| *69 | 44.0 | 4.5 | 38.5 | 13.0 | 0.75 | 2.20 | 3.00 | 12 | 5.25 | 0.00 |
| *70 | 43.5 | 0.5 | 42.0 | 14.0 | 1.00 | 2.20 | 3.00 | 4 | 4.86 | 0.65 |
| *71 | 43.5 | 4.0 | 39.5 | 13.0 | 0.75 | 2.00 | 3.00 | 12 | 5.22 | 0.01 |
| *72 | 43.5 | 5.0 | 38.5 | 13.0 | 0.75 | 2.00 | 3.00 | 13 | 5.25 | 0.00 |

Figure 1:
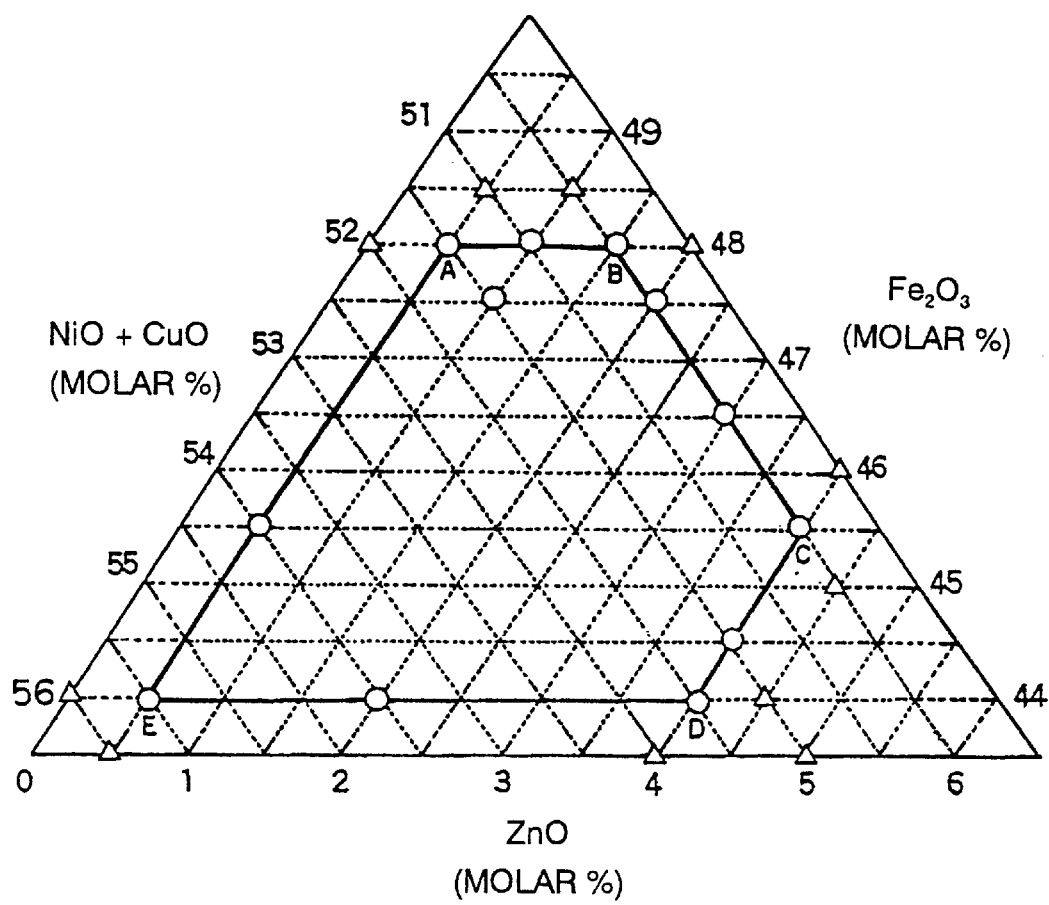
FIG. 1 is a ternary diagram showing the region of the composition of $Fe_2O_3$, ZnO, NiO+CuO as molar percent included as the primary components in the magnetic ceramic composition, in one embodiment according to the present invention.

The samples marked by asterisks in Tables 1 and 2 are out of the region of the present invention. In the samples shown in Tables 1 and 2, the compositions of the primary components are shown in the ternary diagram of FIG. 1. In FIG. 1, circles indicate samples in the region of the present invention, and triangles indicate samples out of the region of the present invention.

As shown in Tables 1 and 2, and more specifically, as shown in FIG. 1, the primary components in the composition ratio ($Fe_2O_3$, ZnO, NiO+CuO) represented by molar percent as $Fe_2O_3$, ZnO, and (NiO and CuO), provide the samples enclosed by point A (48.0, 0.5, 51.5), point B (48.0, 1.5, 50.5), point C (45.5, 4.0, 50.5), point D (44.0, 4.0, 52.0), and point E (44.0, 0.5, 55.5) shown in the ternary diagram of FIG. 1 in the region of the present invention. The samples containing about 8.0 to 14.0 molar percent of CuO are in the region of the present invention. Samples containing about 0.25 to 1.0 parts by weight of $Bi_2O_3$ and about 0.25 to 3.0 parts by weight of $Co_3O_4$ with respect to 100 parts by weight of the primary components are in the region of the present invention.

Less than 44.0 molar percent of $Fe_2O_3$ was not preferable, as can be seen in samples 70 to 72, since the sintering properties were degraded and the initial permeabilities $\mu_i$ were increased. In contrast, more than 48.0 molar percent of $Fe_2O_3$ was not preferable, as can be seen in samples 1 and 2, since the sintering properties were degraded and the initial permeabilities $\mu_i$ were increased.

Less than 0.5 molar percent of ZnO was not preferable, as can be seen in samples 3 and 65, since the sintering properties were degraded. In contrast, more than 4.0 molar percent of ZnO was not preferable, as can be seen in samples 63, 69, and 72, since the initial permeabilities $\mu_i$ were increased.

Less than 8.0 molar percent of CuO was not preferable, as can be seen in samples 31 and 57, since the sintering properties were degraded. In contrast, more than 14.0 molar percent of CuO was not preferable, as can be seen in samples 50 and 62, since the initial permeabilities $\mu_i$ were increased.

Less than 0.25 part by weight of $Bi_2O_3$ was not preferable, as can be seen in sample 32, since the sintering property was degraded. In contrast, more than 1.00 part by weight of $Bi_2O_3$ was not preferable, as can be seen in sample 44, since the initial permeability $\mu_i$ was increased.

Less than 0.25 parts by weight of $Co_3O_4$ was not preferable, as can be seen in samples 9 and 29, since the sintering properties were degraded and the initial permeabilities $\mu_i$ were increased. In contrast, more than 3.00 parts by weight of $Co_3O_4$ was not preferable, as can be seen in sample 30, since the sintering property was degraded.

Concerning samples 8 and 22, individual contents of $Fe_2O_3$, ZnO, NiO and CuO were in the preferable region. However, their composition ratios ($Fe_2O_3$, ZnO, NiO+CuO) were outside the region enclosed by point A (48.0, 0.5, 51.5), point B (48.0, 1.5, 50.5), point C (45.5, 4.0, 50.5), point D (44.0, 4.0, 52.0), and point E (44.0, 0.5, 55.5) in the ternary diagram shown in FIG. 1, so that they were not preferable since the initial permeabilities $\mu_i$ were increased.

As described above, the samples in the region of the present invention showed preferable sintering properties when sintered at 930° C. and had the initial permeabilities below 10.

In the Examples described above, $Co_3O_4$ was employed. However, it was confirmed that the effect obtained by using cobalt carbonate ($Co_3CO_4$) in place of $Co_3O_4$ was equivalent to that obtained thereby. When cobalt carbonate is employed, for example, the parts by weight described above is represented by the parts by weight as $Co_3O_4$.

Next, in order to evaluate temperature properties influenced by the additive amount of $ZrO_2$ for the samples in the region of the present invention, the samples having the compositions as shown in Table 3 were prepared in a manner similar to these of the samples shown in Tables 1 and 2. For these samples, the temperature properties were evaluated along with water absorptions, densities and the initial permeabilities $\mu_i$. In Table 3, the properties described above are shown. For the evaluation of the temperature properties, the initial permeabilities $\mu_i$ at 20° C. and 85° C. were measured by using an impedance analyzer. The temperature properties shown in Table 3 were then evaluated by ratios, that is, the initial permeabilities at 85° C. divided by those at 20° C.

TABLE 3

| Sample No. | Primary Component (molar %) | | | | Additive Component (molar %) | | | $\mu_i$ | Density (g/cm$^3$) | Water Absorption (%) | Temperature Property 85 $\mu_i$/20 $\mu_i$ |
|---|---|---|---|---|---|---|---|---|---|---|---|
| | Fe$_2$O$_3$ | ZnO | NiO | CuO | Bi$_2$O$_3$ | Co$_3$O$_4$ | ZrO$_2$ | | | | |
| 73 | 45.5 | 1.0 | 40.5 | 13.0 | 0.75 | 2.00 | 3.00 | 5 | 5.28 | 0.00 | 1.66 |
| 74 | 45.5 | 1.5 | 40.0 | 13.0 | 0.75 | 2.00 | 3.00 | 5 | 5.26 | 0.00 | 1.61 |
| 75 | 45.5 | 2.0 | 39.5 | 13.0 | 0.75 | 2.20 | 3.00 | 5 | 5.27 | 0.00 | 1.58 |
| 76 | 45.5 | 2.5 | 39.0 | 13.0 | 0.75 | 2.00 | 3.00 | 6 | 5.31 | 0.00 | 1.63 |
| 77 | 45.5 | 3.0 | 28.5 | 13.0 | 0.75 | 2.00 | 3.00 | 7 | 5.28 | 0.00 | 1.71 |
| 78 | 44.5 | 2.0 | 40.5 | 13.0 | 0.75 | 2.00 | 3.00 | 4 | 5.27 | 0.00 | 1.46 |
| 79 | 44.5 | 3.0 | 39.5 | 13.0 | 0.75 | 2.00 | 3.00 | 5 | 5.29 | 0.00 | 1.49 |
| 80 | 46.5 | 2.0 | 38.5 | 13.0 | 0.75 | 2.00 | 3.00 | 7 | 5.19 | 0.00 | 1.71 |
| 81 | 46.5 | 1.0 | 39.5 | 13.0 | 0.75 | 2.00 | 3.00 | 5 | 5.28 | 0.00 | 1.71 |
| 82 | 45.5 | 2.0 | 39.5 | 13.0 | 0.75 | 1.80 | 3.00 | 6 | 5.30 | 0.01 | 1.60 |
| 83 | 45.5 | 2.0 | 39.5 | 13.0 | 0.75 | 2.00 | 0.00 | 8 | 5.28 | 0.00 | 3.00 |
| 84 | 45.5 | 2.0 | 39.5 | 13.0 | 0.75 | 2.00 | 0.25 | 7 | 5.28 | 0.00 | 2.33 |
| 85 | 45.5 | 2.0 | 39.5 | 13.0 | 0.75 | 2.00 | 0.50 | 6 | 5.27 | 0.00 | 1.98 |
| 86 | 45.5 | 2.0 | 39.5 | 13.0 | 0.75 | 2.00 | 1.00 | 5 | 5.31 | 0.00 | 1.70 |
| 87 | 45.5 | 2.0 | 39.5 | 13.0 | 0.75 | 2.00 | 2.00 | 5 | 5.30 | 0.00 | 1.62 |
| 88 | 45.5 | 2.0 | 39.5 | 13.0 | 0.75 | 2.00 | 3.00 | 5 | 5.28 | 0.00 | 1.45 |
| 89 | 45.5 | 2.0 | 39.5 | 13.0 | 0.75 | 2.00 | 3.50 | 4 | 5.25 | 0.00 | 1.68 |
| 90 | 45.5 | 2.0 | 39.5 | 13.0 | 0.75 | 2.00 | 4.00 | 5 | 4.98 | 0.18 | 2.10 |

Referring to Table 3, less than 0.5 part by weight of ZrO$_2$ was not preferable, as can be seen in samples 83 and 84, since the temperature properties were degraded. In contrast, more than 3.5 parts by weight of ZrO$_2$ was not preferable, as can be seen in sample 90, since the sintering property was degraded and the temperature property was degraded.

As described above, about 0.5 to 3.5 parts by weight of ZrO$_2$ is preferable to be added in order to obtain superior temperature properties.

Figure 3:
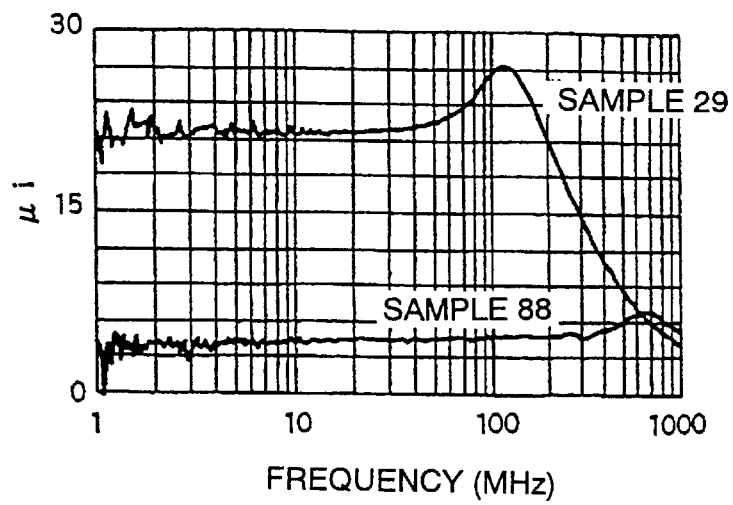
FIG. 3 is a graph comparing frequency characteristics of the initial permeabilities $\mu_i$ of sample 29, which is out of the region of the present invention, and sample 88, which is in the region thereof.

FIG. 3 shows frequency characteristics of the initial permeabilities $\mu_i$. In FIG. 3, sample 29, which is out of the region of the present invention, and sample 88, which is in the region thereof, are comparatively shown. The samples used for this evaluation were toroidal cores prepared in the manner described above.

As can be seen from FIG. 3, the initial permeability $\mu_i$ of sample 29 was relatively high and the threshold frequency thereof remained at approximately 100 MHz. In contrast, the initial permeability $\mu_i$ of sample 88 was not only below 10, but also the threshold frequency thereof was increased to a higher frequency of approximately 700 MHz.

Figure 4:
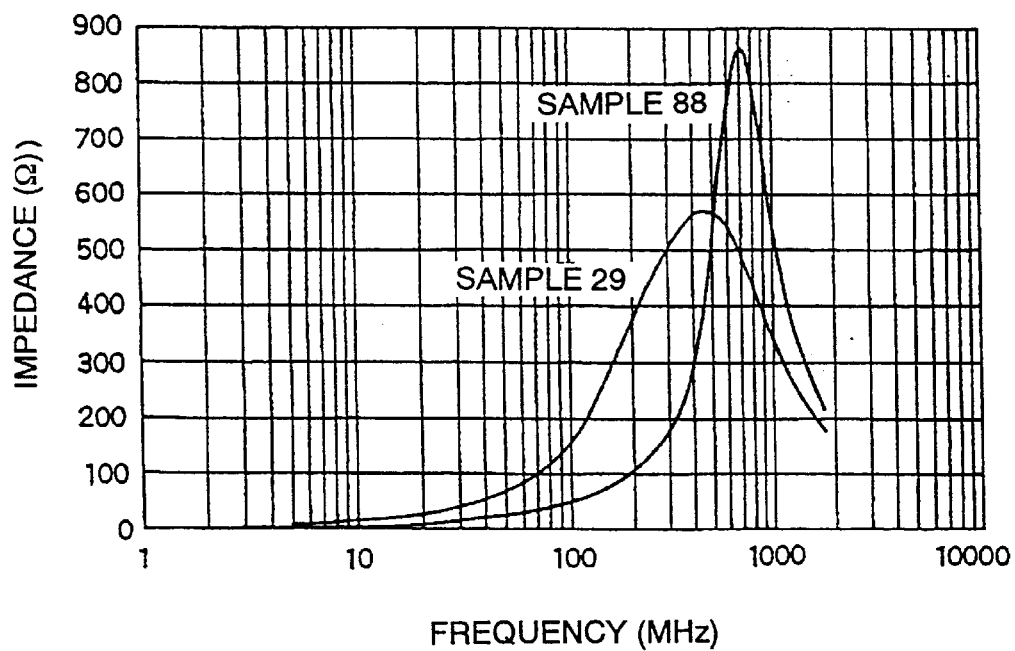
FIG. 4 is a graph comparing frequency characteristics of impedances of sample 29, which is out of the region of the present invention, and sample 88, which is in the region thereof.

FIG. 4 shows frequency characteristics of impedance. In FIG. 4, sample 29, which is out of the region of the present invention, and sample 88, which is in the region thereof, are also comparatively shown. The samples, which were used for this evaluation of the frequency characteristics of the impedance, were in the form of stacked chip inductors, as shown in FIG. 2, provided with the internal conductors having 6.5 turns.

As can be seen from FIG. 4, the rise of the impedance curve of sample 29 was not very steep. In contrast, the rise of the impedance curve of the sample 88 was steep, and the impedance at approximately 700 MHz was high, whereby it was confirmed that sample 88 had superior effects for countermeasures against noise.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A magnetic ceramic composition comprising:

a Fe compound, a Zn compound, a Ni compound and a Cu compound as primary components; and a bismuth compound and a cobalt compound as additive components;

wherein the composition ratio (Fe$_2$O$_3$, ZnO, NiO+CuO) of the Fe compound, the Zn compound, the Ni compound, and the Cu compound represented by molar percent calculated as Fe$_2$O$_3$, ZnO, and (NiO CuO) is in the region enclosed by point A (48.0, 0.5, 51.5), point B (48.0, 1.5, 50.5), point C (45.5, 4.0, 50.5), point D (44.0, 4.0, 52.0), and point E (44.0, 0.5, 55.5) in a ternary diagram, wherein the amount of the Cu compound included in 100 molar percent of the primary components Fe$_2$O$_3$, ZnO, NiO and CuO is about 8.0 to 14.0 molar percent, wherein the amount of the bismuth compound as Bi$_2$O$_3$ is about 0.25 to 1.0 part by weight and the amount of the cobalt compound as Co$_3$O$_4$ is about 0.25 to 3.0 parts by weight with respect to 100 parts by weight of the primary components as Fe$_2$O$_3$, ZnO, NiO and CuO, and about 0.5 to 3.5 parts by weight of a zirconium compound calculated as ZrO$_2$ with respect to 100 parts by weight of the primary components as Fe$_2$O$_3$, ZnO, NiO and CuO.

2. A magnetic ceramic composition according to claim 1, comprising about 0.75 to 3 parts by weight of a zirconium compound calculated as ZrO$_2$ with respect to 100 parts by weight of the primary components as Fe$_2$O$_3$, ZnO, NiO and CuO.

3. A magnetic ceramic composition according to claim 2, wherein the amount of the Cu compound included in 100 molar percent of the primary components Fe$_2$O$_3$, ZnO, NiO and CuO is about 10 to 13 molar percent, the amount of the bismuth compound as Bi$_2$O$_3$ is about 0.5 to 1.0 part by weight and the amount of the cobalt compound as Co$_3$O$_4$ is about 0.4 to 2.5 parts by weight with respect to 100 parts by weight of the primary components as Fe$_2$O$_3$, ZnO, NiO and CuO.

4. A magnetic ceramic composition according to claim 1, wherein the amount of the Cu compound included in 100 molar percent of the primary components $Fe_2O_3$, ZnO, NiO and CuO is about 10 to 13 molar percent, the amount of the bismuth compound as $Bi_2O_3$ is about 0.5 to 1.0 part by weight and the amount of the cobalt compound as $Co_3O_4$ is about 0.4 to 2.5 parts by weight with respect to 100 parts by weight of the primary components as $Fe_2O_3$, ZnO, NiO and CuO.

5. In an inductor component which comprises a magnetic body, the improvement which comprises the magnetic body comprising the ceramic composition according to claim 4.

6. An inductor component according to claim 5, wherein the inductor has a laminated structure with an internal conductor therein.

7. In an inductor component which comprises a magnetic body, the improvement which comprises the magnetic body comprising the ceramic composition according to claim 3.

8. An inductor component according to claim 7, wherein the inductor has a laminated structure with an internal conductor therein.

9. In an inductor component which comprises a magnetic body, the improvement which comprises the magnetic body comprising the ceramic composition according to claim 2.

10. An inductor component according to claim 9, wherein the inductor has a laminated structure with an internal conductor therein.

11. In an inductor component which comprises a magnetic body, the improvement which comprises the magnetic body comprising the ceramic composition according to claim 1.

12. An inductor component according to claim 11, wherein the inductor has a laminated structure with an internal conductor therein.

* * * * *